United States Patent [19]

Atchley et al.

[11] 4,338,884
[45] Jul. 13, 1982

[54] ANIMAL BITE VALVE

[75] Inventors: Frank W. Atchley; Donald W. Vorbeck; Ronald L. Wurz, all of Napa, Calif.

[73] Assignee: ATCO Manufacturing Co., Inc., Napa, Calif.

[21] Appl. No.: 241,645

[22] Filed: Mar. 9, 1981

[51] Int. Cl.³ .............................................. A01K 7/06
[52] U.S. Cl. ..................................... 119/72.5; 119/75
[58] Field of Search ................. 119/72.5, 75; 251/299, 251/339, 357

[56] References Cited

U.S. PATENT DOCUMENTS

| | | |
|---|---|---|
| 1,698,961 | 1/1929 | Mueller . |
| 2,710,594 | 6/1955 | Thompson . |
| 2,939,424 | 6/1960 | Frederiksen . |
| 3,128,745 | 4/1964 | Alter ................................. 119/75 |
| 3,132,774 | 5/1964 | Soffer . |
| 3,289,635 | 12/1966 | Eagles . |
| 3,581,713 | 6/1971 | Crooks ............................ 119/72.5 |
| 3,611,999 | 10/1971 | Hey . |
| 3,613,642 | 10/1971 | Restall . |
| 3,646,955 | 3/1972 | Olde . |
| 3,698,431 | 10/1972 | Thompson . |
| 3,734,063 | 5/1973 | Atchley . |
| 3,800,825 | 4/1974 | Zoll . |
| 3,874,343 | 4/1975 | Niki . |
| 4,006,716 | 2/1977 | Cross . |

FOREIGN PATENT DOCUMENTS

| | | |
|---|---|---|
| 1016506 | 4/1950 | France . |
| 1120351 | 3/1955 | France . |
| 51-144485 | 11/1976 | Japan . |
| 774904 | 3/1954 | United Kingdom . |
| 957300 | 12/1980 | United Kingdom . |
| 437506 | 12/1969 | U.S.S.R. . |

Primary Examiner—Hugh R. Chamblee
Attorney, Agent, or Firm—James R. Cypher

[57] ABSTRACT

An animal bite valve for dispensing water on demand which is formed with a lever operated by the animal. The valve is opened by either pushing the valve inwardly longitudinally or by tilting. The lever is formed with an annular non-flexible flange which bears against a non-flexible annular land as a fulcrum. Sealing is effected by a flexible cup seal which rests upon a valve seat and is lifted therefrom by the tilting of the valve member.

A baffle inserted in the downstream flow portion of the housing, directs the water into the mouth of the animal. Curved portions in the baffle cause a portion of the water to swirl, create turbulence and reduce velocity.

9 Claims, 9 Drawing Figures

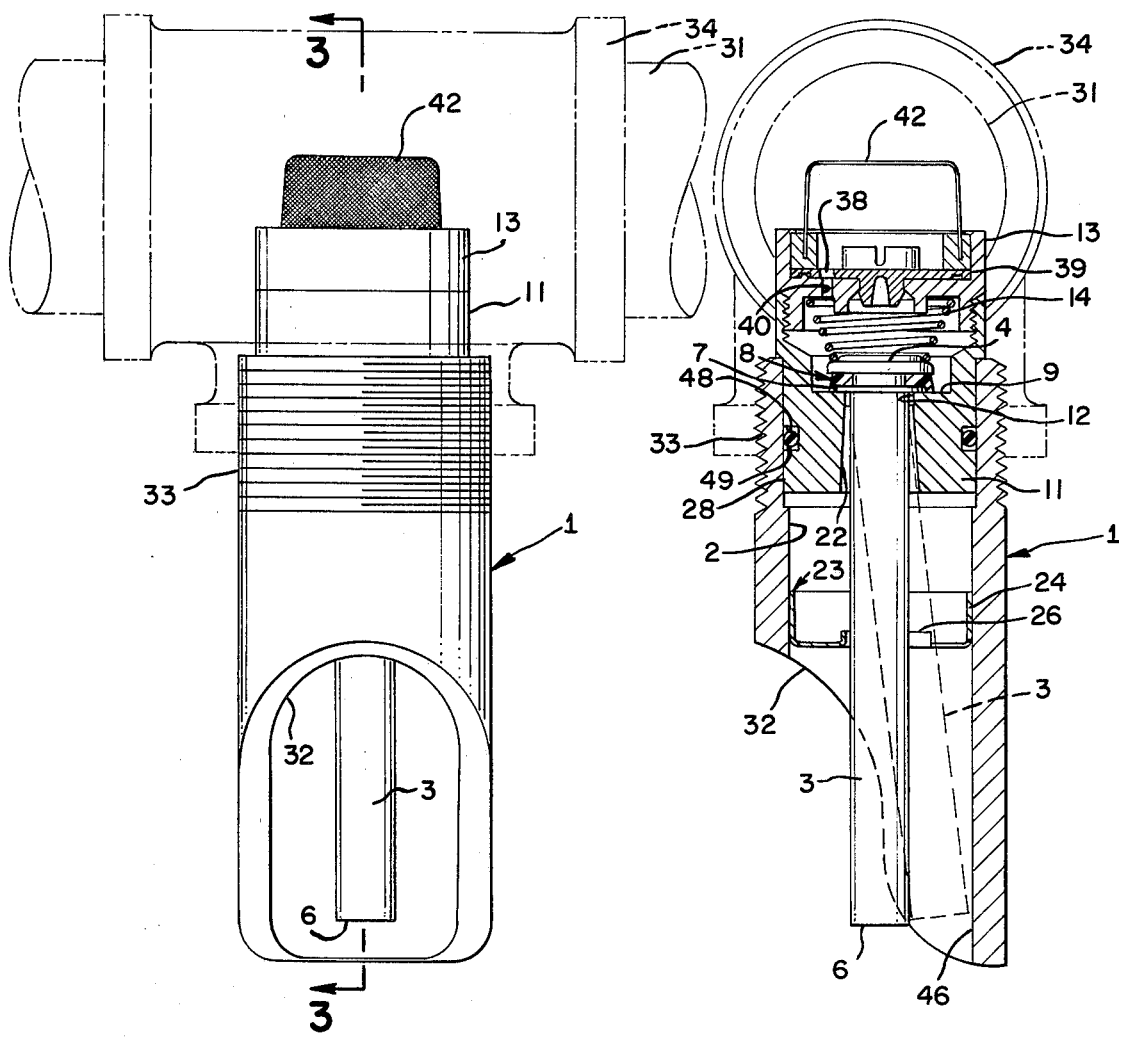
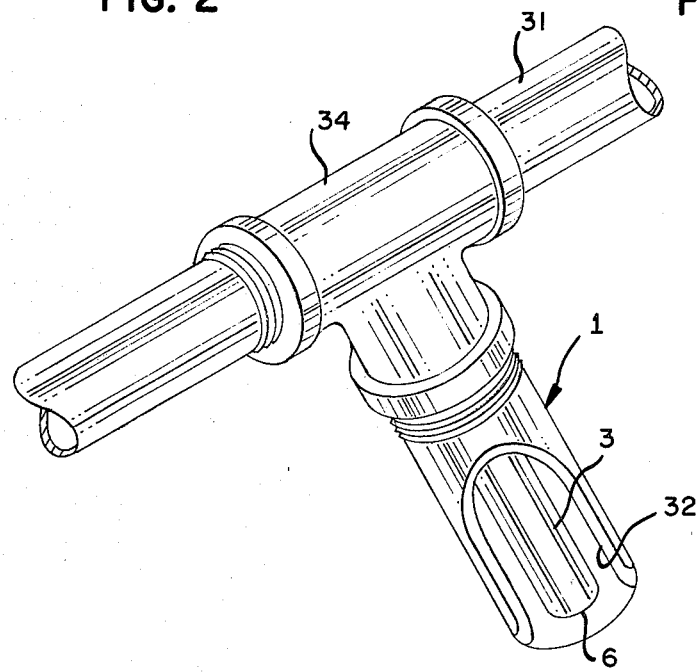
FIG. 2
FIG. 3
FIG. 1

ANIMAL BITE VALVE

BACKGROUND OF THE INVENTION:

This invention relates to a water valve which is operable by pigs, sheep, dogs and primates.

The valve is operated by the animal biting and tilting an elongated lever causing water to flow. All prior bite valves known to Applicant include a metal flange which pivots or closes against and compresses an elastic seal. A spring usually forces the metal flange against the flexible seal and in time, the elastic seal compresses permitting leakage or restricting flow. Examples of valves which are operable by a tilting lever with a metal flange forming a mechanical compression seal against a flexible compressible seat are as follows:

| U.S. PAT. NO.: | GRANT DATE: | INVENTOR: |
| --- | --- | --- |
| 1,698,961 | Jan. 15, 1929 | R. Mueller |
| 2,710,594 | June 14, 1955 | E. C. Thompson |
| 2,939,424 | June 7, 1960 | R. O. Frederiksen |
| 3,132,774 | May 12, 1964 | J. W. Soffer |
| 3,289,635 | Dec. 6, 1966 | R. P. Eagles |
| 3,611,999 | Oct. 12, 1971 | John S. Hey |
| 3,613,642 | Oct. 19, 1971 | George Restall |
| 3,646,955 | March 7, 1972 | Jarl R. Olde |
| 3,698,431 | Oct. 17, 1972 | Earl C. Thompson |
| 3,734,063 | May 22, 1973 | Frank W. Atchley |
| 3,800,825 | April 2, 1974 | Andre Zoll |
| 3,874,343 | April 1, 1975 | Motohiro Niki |
| 4,006,716 | Feb. 8, 1977 | David L. Cross |
| U.S. PAT. NO.: | GRANT DATE: | COUNTRY: |
| 437,506 | Dec. 9, 1969 | USSR |
| 144,485 | Nov. 29, 1976 | Japan |
| 1,016,506 | April 20, 1950 | France |
| 1,120,351 | March 7, 1955 | France |
| 774,904 | March 30, 1954 | Great Britain |
| 957,300 | Dec. 1, 1980 | Great Britain |

SUMMARY OF THE INVENTION

The special features of the present invention are as follows:

a. A metal-to-solid contact at the fulcrum point provides non-wearing positive assured action.

b. The absence of a metal lever in compression with an elastic seal permits drip free operation at water pressures from 0.25 psi up to 100 psi, and water flow is not reduced due to compression of O-ring seals.

c. The metal-to-solid contact provides increased tilt action allowing greater water flow where water pressure is low.

d. A special elastic cup seal lifts upward against the direction of water flow providing improved flushing and decreased problems of sand and/or silt entrapment.

e. The cup seal provides a good seal via elastic movement under water pressure. The cup seal is dimensioned so that elastic limits are not exceeded and the controlled compression insures that the seals do not deform, extrude or cold flow under uncontrolled pressure, thereby vastly extending the life of the elastic seal.

f. The sealing member is mechanically attached to the valve lever head eliminating bonding, vulcanzing, or gluing techniques. Attachment of the seal is more assured and less expensive than other techniques.

g. Gentle water delivery is effected by a baffle which creates water turbulence within the valve housing.

h. Improved freeze protection is provided by recessing the valve components into the pipe thereby using the water stream as a source of heat to reduce freezing.

i. Positioning the valve components such as the filter screen in the water stream helps to flush and clean it.

j. The valve may be opened by the animal pushing directly against the end of the valve lever. Movement of the valve lever and cup seal against the direction of water flow assists in flushing the valve seat of any entrapped sand or other particles in the water supply.

k. Water pressure augments closure of the valve and sealing of the cup seal.

BRIEF DESCRIPTION OF THE DRAWINGS:

FIG. 1 is a perspective of the valve of the present invention shown connected to a T fitting inserted in a water manifold pipe.

FIG. 2 is a top plan view of the valve member with portions of the manifold pipe in phantom line.

FIG. 3 is a cross sectional view of the valve shown in FIG. 2 taken along line 3—3.

Figure 4:
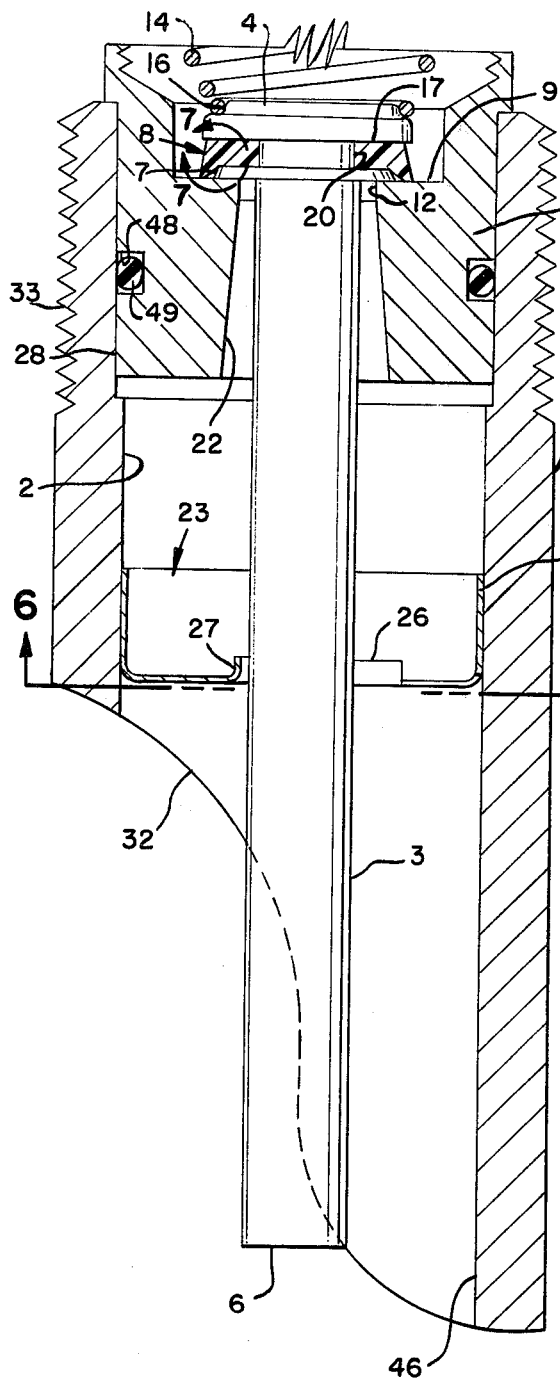
FIG. 4 is an enlarged cross sectional view of a portion of the valve shown in FIG. 3.

DESCRIPTION OF THE PREFERRED EMBODIMENTS:

The animal bite valve of the present invention consists briefly of a housing 1, formed with an opening 2 therethrough; a non-flexible fulcrum means mounted within the housing; an elongated valve lever 3 mounted in the housing and having an inner end 4 and a distal end 6, and having an inflexible flange 7 positioned for tilting registration with the non-flexible fulcrum means; valve seat means mounted in the housing; a flexible cup seal member 8 mounted on the lever for tilting movement therewith and for sealing and unsealing engagement with the valve seat means; and biasing means mounted in the housing biasing the inflexible flange on the valve lever into engagement with the non-flexible fulcrum means.

The non-flexible fulcrum means and the valve seat means may consist of separate structures but preferable are a single annular land 9. This annular land may be formed in the wall of the housing, but preferably it is formed in an insert 11 dimensioned for receipt with the housing. The insert is formed with an opening 12 for receiving the valve lever therethrough.

A spring retainer member 13 is mounted within the housing and is spaced from the annular land. The biasing means may be a spring 14 held by the spring retainer and positioned in engagement with a shoulder 16 on the end of the valve lever. The spring retainer, spring, and valve lever are positioned to permit axial reciprocation of the valve lever as well as tilting movement upon engagement of the distal end of the valve lever by an animal.

The cup seal member 8 is formed with a base 17 which is retained by the side walls 18 and 19 of annular groove 20 formed in the valve lever member.

The opening in the insert for receiving the valve lever therethrough is formed with a flared portion 22 which permits tilting of the lever.

A baffle member 23 having a peripheral annular wall 24 may be placed in sealing registration with the inside wall of the housing. The baffle has an opening 26 for passage of the lever member and for directing water therethrough.

Preferably the opening in the baffle member is formed with inwardly turned edges 27 to provide a swirling action to the water passing therethrough for increasing the turbulence and decreasing the water discharge velocity.

In one form of the invention, the insert 11 is formed from metal with a knurled outer perimeter wall 28 dimensioned for force fit retention within the housing.

Figure 9:
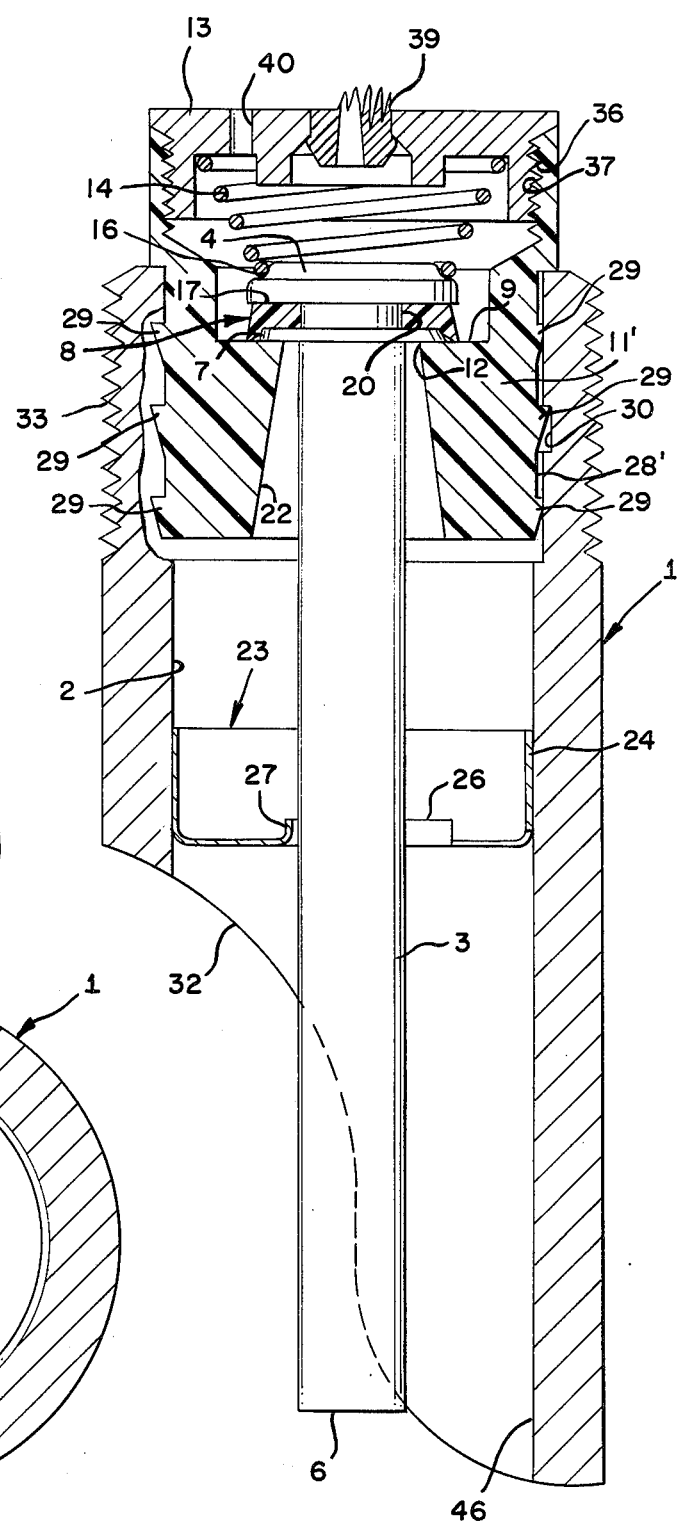
FIG. 9 is a cross sectional view of an alternate form of the invention.

In another form of the invention an insert 11' is formed from plastic as shown in FIG. 9. The plastic insert is nearly indentical to the metal insert shown in FIGS. 3-5 and like parts carry identical numbers. Instead of a knurled wall, however, the plastic insert is formed with a peripheral wall 28' with protruding beads 29 for frictional and sealing retention with the inner wall of the housing. An annular groove 30 may be formed in the inner wall of the housing to provide mechanical locking with bead 29 of insert 11'.

As shown in FIGS. 2, 3, and 9 the inserts 11 and 11' protrude from the inner end of the housing so that a substantial portion is adapted to project into a manifold water supply pipe 31 to assist in the avoidance of freezing of the valve when subject to freezing temperatures.

The detailed construction and assembly of the valve of the present invention is as follows. Housing 1 is preferably made from metal with a cutout portion 32 which permits the animal to bite the lever 3. Note that the lever is placed within the housing which acts as a guard for the lever. The housing is formed with external pipe threads 33 to permit the valve to be threadably attached to the supply pipe or with internal threads in a T-section 34.

The spring retainer member 13 may be formed with external threads 36 to threadably register with internal threads 37 formed in the insert 11' as shown in FIG. 9. Spring retainer 13 is formed with at least one opening 40 therethrough for the passage of water. This opening registers with at least one opening 38 in a water flow control member 39 as shown in FIG. 3.

A screen 42 retained by spring retainer member 13 filters the water flowing through the valve.

OPERATION OF THE VALVE:

FIGS. 2, 3, 4, 7 and 9 show the valve in the normally closed position. Spring 14 bearing against shoulder 16 of the end of lever 3 causes annular non-flexible flange 7 to rest upon non-flexible land 9 of insert 11 or 11'. Flexible cup seal 8 is in sealing engagement with the valve seat which in the valve illustrated is annular land 9. The cup seal may be made from a material sold under the trademark Viton owned by Dupont de Nemours, Inc. As shown in detail in FIG. 7, the cup seal is formed with a downwardly facing annular wall 43 which terminates in a sealing edge 44. Note that water pressure on the supply side of the cup seal assists in the water seal by forcing sealing edge 44 in close fitting engagement with non-flexible land 9 of insert 11 or 11'. There is a uniform pressure exerted by the mechanical holding of the cup seal within the annular groove in the lever member. This uniform pressure is governed by the initial dimensions of the parts rather than by any operation of the valve. The force exerted by spring 14 exerts a minimal force upon the cup seal 8. The main biasing energy of the spring causes the metal to solid compression contact between metal flange 7 on inflexible annular land 9.

Figure 5:
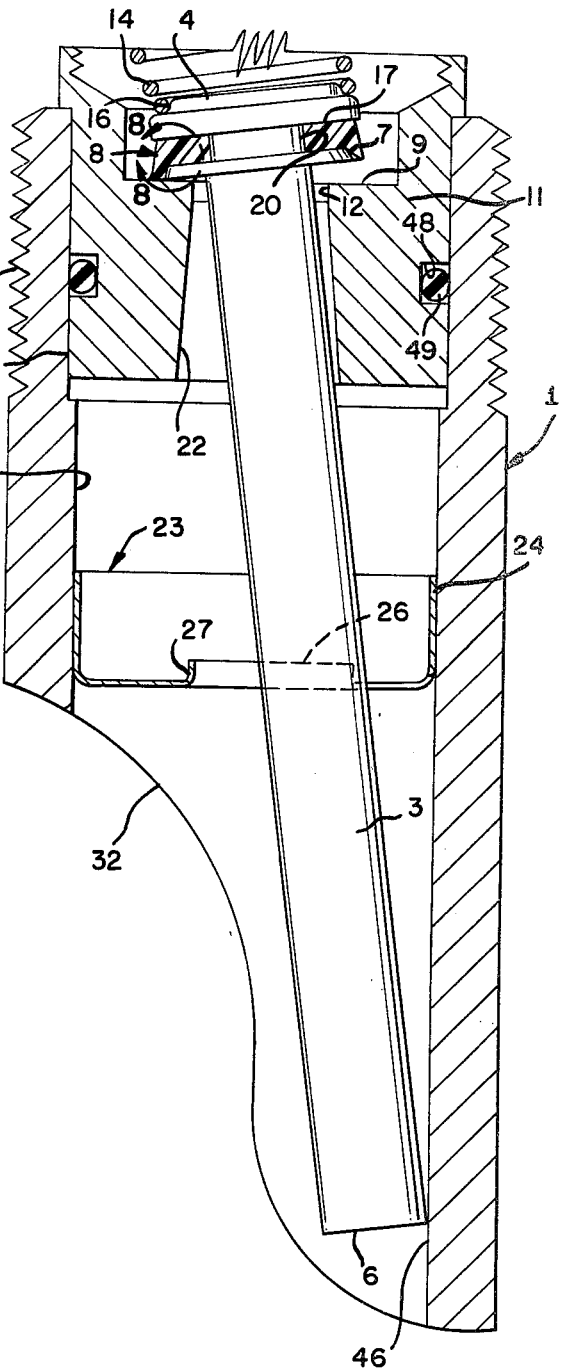
FIG. 5 is a cross sectional view of the valve shown in FIG. 4 with the valve lever in the actuated position.
Figure 7:
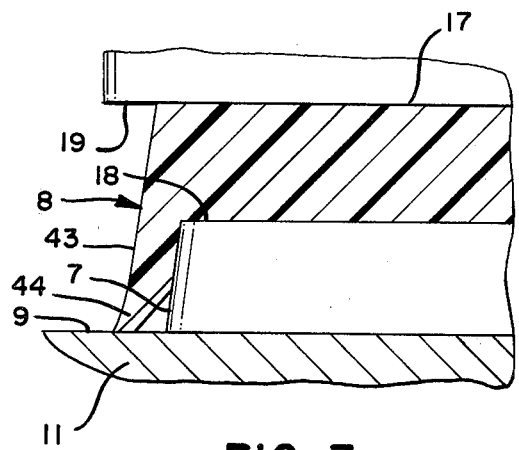
FIG. 7 is an enlarged view of a portion of the device shown in FIG. 4 taken in the vicinity of line 7—7.
Figure 8:
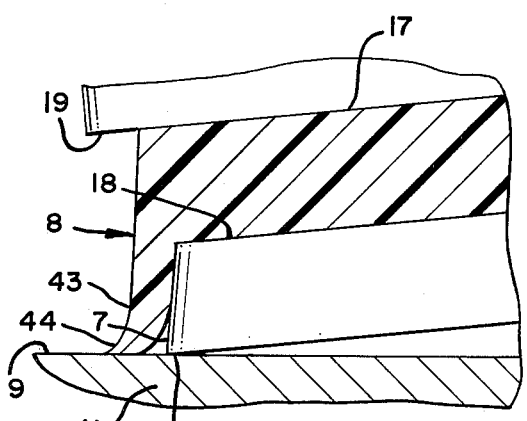
FIG. 8 is an enlarged cross sectional view of a portion of the valve shown in FIG. 5 taken generally along line 8—8.
Figure 6:
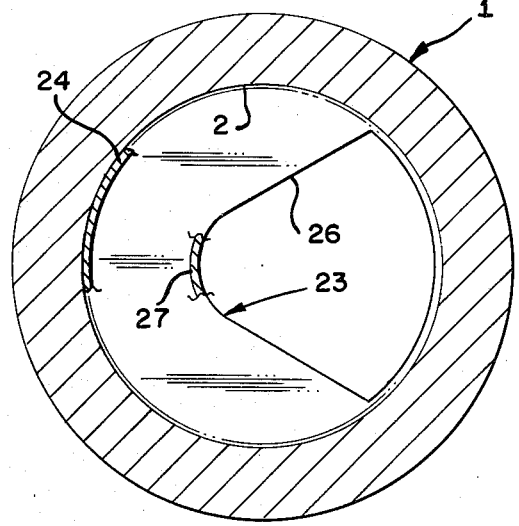
FIG. 6 is a cross sectional view of the valve shown in FIG. 4 taken along line 6—6.

When the animal depresses the end 6 of the lever toward or against the inside wall 46 of the housisng as shown in FIGS. 3, 5 and 8, the inside wall acts as a stop and the lever tilts on the inflexible fulcrum point which in the illustrations is the inflexible flange 7. As shown clearly in FIG. 8, the flange tilts upon fulcrum edge 47 on the rim of inflexible flange 7. By tilting on the inflexible rim of flange 7, there is little additional compressive force exerted on the sealing edge 44 of the annular wall 43 of the cup seal. There is merely a slight distortion of the sealing edge 44 as shown in FIG. 8. As shown in FIGS. 5 and 6, the opposite side of the cup seal is actually lifted off the annular land 9 against the flow of the water and against the water pressure to permit the flow of water between the raised cup seal and the annular land 9. When the animal releases the end of the lever, the spring 14 returns the lever to the sealed position and stops the flow of water. A shown in FIGS. 7 and 8, flange 7 flares outwardly and forms approximately an 81° angle rather than a 90° angle.

Since the opening and closing of the valve causes a tilting of the valve member on a metal to metal or solid to inflexible member contact, there is very little compression of the cup seal and therefore the life of the flexible seal is much longer. There is little wear occuring on the cup seal and little compression of the flexible cup seal to cause leakage. This unique construction permits functional operation up to 100 psi.

As previously stated, a substantial portion of the internal parts of the valve member are located within the supply pipe. This assists in the prevention of freezing of the valve in freezing temperatures. Turbulence and reduced velocity of the water is enhanced by the baffle 23. As the water flows through the small opening 12 into the flared opening 22, it loses some of its velocity and then a portion strikes the wall of the baffle. A still smaller portion is deflected back towards the opening 22, by the curved portions 27 on the edge of the opening 26. As shown in FIG. 6, the opening 26 in the baffle may be generally triangular shape.

The baffle not only channels the flow of water into the animals mouth but assists in preventing food and debris from being forced back into the working parts of the valve.

Insert 11 is formed with an annular groove 48. O-ring 49 is dimensioned for receipt in groove 48 to provide sealing.

We claim:

1. An animal bite valve comprising:
   a. a housing formed with an opening therethrough.
   b. non-flexible fulcrum means mounted within said housing;
   c. an elongated valve lever mounted in said housing having an inner end and a distal end, and having an inflexible flange formed with a fulcrum edge on its rim and positioned for tilting registration with said non-flexible fulcrum means and an annular channel formed therein between said inflexible flange and said inner end;
d. valve seat means having an annular land mounted in said housing;
e. a flexible cup seal member having an annular base registering with said annular channel for mounting on said lever for tilting movement therewith and having an annular wall extending from said base beyond said fulcrum edge of said inflexible flange for sealing and unsealing engagement with said annular land on said valve seat means; and
f. biasing means mounted in said housing biasing said inflexible flange on said valve lever into engagement with said non-flexible fulcrum means.

2. A valve as described in claim 1 wherein:
a. said non-flexible fulcrum means and said valve seat means both consist of a single annular land.

3. A valve as described in claim 2 comprising:
a. said non-flexible fulcrum means and said valve seat means includes an insert dimensioned for receipt within said housing and is formed with an opening for receiving said valve lever therethrough and is formed to provide said annular land.

4. A valve as described in claim 3 comprising:
a. said insert is formed to protrude from the inner end of said housing so that a substantial portion is adapted to project into a manifold water supply pipe to assist in the avoidance of freezing of the valve when subject to freezing temperatures.

5. A valve as described in claim 3 comprising:
a. a spring retainer member mounted within said housing and spaced from said annular land;
b. said biasing means is a spring held by said spring retainer and positioned in engagement with an end of said valve lever; and
c. said spring retainer, spring, and valve lever are positioned to permit axial reciprocation of said valve lever as well as tilting movement upon engagement of said distal end by an animal.

6. A valve as described in claim 5 comprising:
a. said opening in said insert for receiving said valve lever therethrough is formed with a flared portion permitting tilting of said lever; and
b. a baffle member having a peripheral annular wall in registration with the inside wall of said housing, and having an opening therethrough for the passage of lever member and for directing water therethrough.

7. A valve as described in claim 6 wherein:
a. said opening in said baffle member is formed with inwardly turned edges providing a swirling action to the water passing therethrough for increasing the turbulence.

8. A valve as described in claim 7 comprising:
a. said insert is formed from metal with a knurled outer perimeter wall dimensioned for force fit retention within said housing.

9. A valve as described in claim 7 comprising:
a. said insert is formed from plastic with a serrated outer peripheral wall for frictional retention with the inner wall of said housing.

* * * * *